(12) United States Patent
Caballero et al.

(10) Patent No.: US 8,532,328 B2
(45) Date of Patent: Sep. 10, 2013

(54) METHODS AND APPARATUS FOR PLANETARY NAVIGATION

(75) Inventors: David L. Caballero, Huntington Beach, CA (US); Thomas Paul Weismuller, Orange, CA (US)

(73) Assignee: The Boeing Company, Chicago, IL (US)

( * ) Notice: Subject to any disclaimer, the term of this patent is extended or adjusted under 35 U.S.C. 154(b) by 1609 days.

(21) Appl. No.: 11/893,619

(22) Filed: Aug. 16, 2007

(65) Prior Publication Data

US 2009/0048780 A1 Feb. 19, 2009

(51) Int. Cl.
*G06K 9/00* (2006.01)
(52) U.S. Cl.
USPC ........... 382/100; 382/103; 382/104; 382/199; 382/209; 382/218; 382/279; 382/281; 382/283; 382/325; 701/13; 244/3.18
(58) Field of Classification Search
USPC .................. 701/13, 200, 222, 226; 244/3.18
See application file for complete search history.

(56) References Cited

U.S. PATENT DOCUMENTS

| 4,739,401 | A | * | 4/1988 | Sacks et al. ................. 382/103 |
| 5,146,228 | A | * | 9/1992 | Irani et al. ................... 382/278 |
| 5,719,773 | A | * | 2/1998 | Choate ......................... 701/223 |
| 6,023,291 | A | * | 2/2000 | Kamel et al. ................. 348/147 |
| 6,904,160 | B2 | * | 6/2005 | Burgess ........................ 382/113 |
| 6,954,551 | B2 | | 10/2005 | Weismuller | 
| 7,310,578 | B2 | * | 12/2007 | Alstad et al. ................. 244/164 |
| 7,421,116 | B2 | * | 9/2008 | Fan et al. ..................... 382/164 |
| 2006/0149458 | A1 | * | 7/2006 | Costello et al. .............. 701/200 |

OTHER PUBLICATIONS

Cheng-Chih Chu, David Q. Zhu, Suraphol Udomkesmalee, and Marc I. Pomerantz, "Realization of autonomous image-based spacecraft pointing systems: planetary flyby example" SPIE's International Symposium on Optical Engineering in Aerospace Sensing, Apr. 1994, pp. 1-14.*
Carl Christian Liebe, "A new strategy for tracking planetary terrains" Proceedings of SPIE, Acquisition, Tracking and Pointing VIII, vol. 2221, Jul. 1994, pp. 41-55.*
Suraphol Udomkesmalee, George E. Sevaston, and Richard H. Stanton, "Toward an autonomous feature-based pointing system for planetary missions" Proceedings of SPIE, Space Guidance, Control, and Tracking, vol. 1949 Issue 2, Apr. 1993, pp. 2-14.*
D. H. Ballard, "Generalizing the Hough Transform to Detect Arbitrary Shapes", Pattern Recognition, vol. 13, No. 2, 1981, pp. 111-122.*

* cited by examiner

*Primary Examiner* — Eric Rush
(74) *Attorney, Agent, or Firm* — Harness, Dickey & Pierce, P.L.C.

(57) ABSTRACT

A method of navigating a space vehicle. An image of a planet surface is received. The received image is processed to identify edge pixels and angle data. The edge pixels and angle data are used to identify planetary features by shape, size, and spacing relative to other planetary features. At least some of the planetary features are compared with a predefined planet surface description including sizes and locations of planet landmarks. One or more matches are determined between the planetary feature(s) and the planet surface description. Based on the match(es), a location of the space vehicle relative to the planet is determined.

20 Claims, 6 Drawing Sheets

METHODS AND APPARATUS FOR PLANETARY NAVIGATION

FIELD

The present disclosure relates generally to navigation of a space vehicle and more particularly (but not exclusively) to determining the location of a space vehicle relative to a planetary body.

BACKGROUND

The statements in this section merely provide background information related to the present disclosure and may not constitute prior art.

Planetary bodies such as the moon and Mars may be explored in future by means of manned and/or unmanned space vehicles. Navigators on earth traditionally have used star constellations for navigation and pointing purposes. Navigational techniques can include the use of ground stations to triangulate orbital position as well as the use of previously gathered knowledge as to the earth's gravitational fields. Flights to other planets, however, may present navigational challenges. Ground stations are entirely lacking on other planetary bodies. Effects of local irregularities in planetary gravitational fields could cause uncertainty in determining the orbital positioning of a space vehicle over time. Although such irregularities have been comprehensively characterized for the earth, this is not true for other planetary bodies.

SUMMARY

The present disclosure, in one configuration, is directed to a method of navigating a space vehicle. An image of a planet surface is received. The received image is processed to identify a plurality of edge pixels and angle data for each of the edge pixels. The edge pixels and angle data are used to identify a plurality of planetary features by shape, size, and spacing relative to other planetary features. At least some of the identified planetary features are compared with a predefined planet surface description including sizes and locations of a plurality of planet landmarks. Based on the comparing, one or more matches are determined between the planetary feature(s) and the planet surface description. Based on the match(es), a location of the space vehicle relative to the planet is determined.

In another configuration, the disclosure is directed to a method of navigating a space vehicle. An image of a planet surface is received using an imaging sensor of the vehicle. A plurality of edge pixels in the received image are identified. For each edge pixel, angle data is obtained relative to an edge that includes the edge pixel. One or more planetary features are determined based on the angle data, shape(s) that include at least some of the edge pixels, and size(s) of the shape(s). The planetary feature(s) are compared with a predefined planet surface description including positions and sizes of a plurality of planet landmarks. Based on the comparing, one or more matches are determined between the planetary feature(s) and the planet surface description. Based on the match(es), a location of the space vehicle is determined relative to the planet.

In yet another configuration, the disclosure is directed to a system for navigating a space vehicle. The system includes an imaging sensor of the vehicle. The sensor is configured to receive an image of a planet surface. A processor and memory are configured to identify a plurality of edge pixels in the received image and, for each edge pixel, to obtain angle data relative to an edge that includes the edge pixel. The processor and memory are configured to determine one or more planetary features based on the angle data, one or more shapes that include at least some of the edge pixels, and size(s) of the shape(s). The processor and memory are further configured to compare the planetary feature(s) with a predefined planet surface description that includes positions and sizes of a plurality of planet landmarks. Based on the comparison, the system determines one or more matches between the planetary feature(s) and one or more of the landmarks. Based on the match(es), the system determines a location of the space vehicle relative to the planet.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
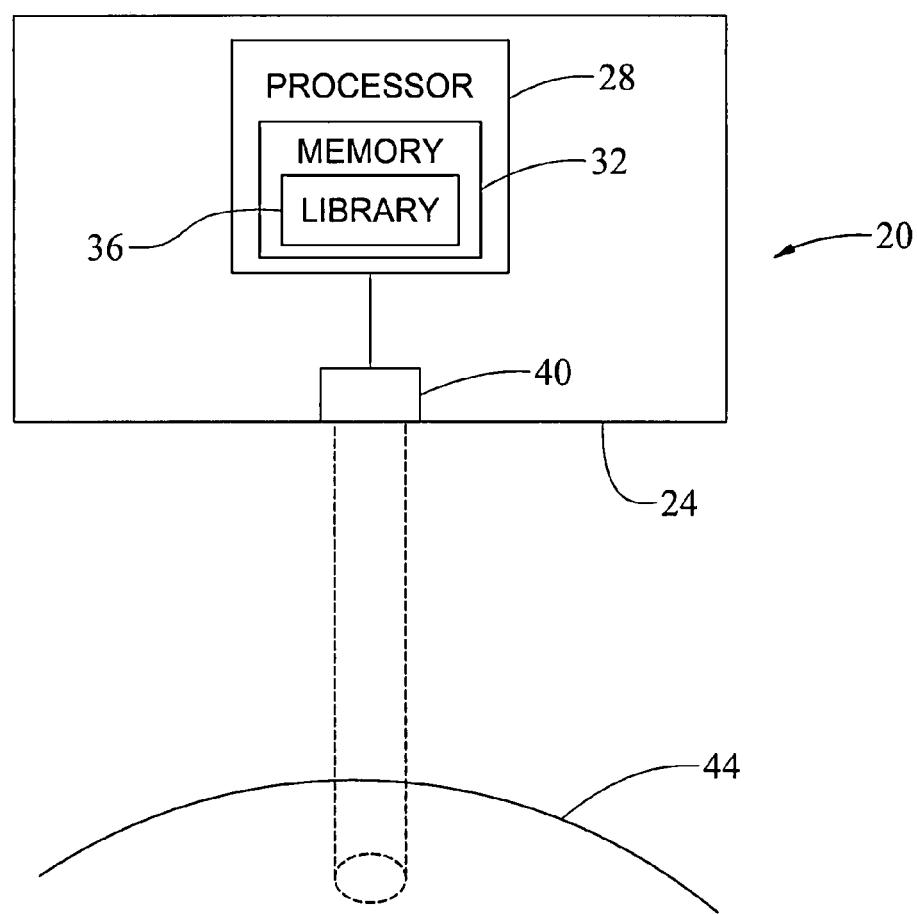
FIG. 1 is a navigation system in accordance with one implementation of the disclosure.

The following description is merely exemplary in nature and is not intended to limit the present disclosure, application, or uses. It should be understood that throughout the drawings, corresponding reference numerals indicate like or corresponding parts and features.

In various implementations, the present disclosure is directed to systems and methods of determining the position of a space vehicle that do not rely on previously generated positional information for that vehicle. A space vehicle orbiting or otherwise traveling relative to a planet may collect images of the planetary surface to identify surface features of the planet. The planetary features may be compared to a predefined planet surface description stored, for example, in an onboard library. The library may include landmarks in areas of the planet covered, e.g., by orbital paths of interest. Areas of interest could include all or most of the planet. Comparisons of feature separation, size, and/or other discriminating parameters may be used to determine a unique solution as to latitude and longitude position of the vehicle over the planet. This determination may be performed autonomously in the vehicle and may be repeated continuously and/or as often as desired, e.g., to update latitude and longitude positions for maintaining a current position in orbit.

A navigation system in accordance with one implementation of the disclosure is indicated generally in FIG. 1 by reference number 20. The system 20 is implemented in a space vehicle 24. The system 20 includes a processor 28 having a memory 32. A library 36, used by the processor 28 as further described below, may be stored in the memory 32. Although a single processor and memory are shown, more than one processor and/or memory could be used, as is well known in the art. It should be understood that many different configurations of processors, computers, microprocessors, memories, storage devices, communication devices, etc., could be used in various implementations. Furthermore, although the exemplary system 20 may be implemented on board the space vehicle 24, it should be noted that various implementations could include at least some participation by crews, processors and/or other or additional system components located on the ground, in the air, in space, and/or even on another planet.

The system 20 includes an imaging sensor 40. The sensor 40 is configured to receive an image of a planet surface 44, e.g., as the vehicle 24 passes over the surface 44. Although one sensor 40 is shown in FIG. 1, more than one sensor could be included in the system 20. In some implementations, an optical sensor 40 may be used in daytime to collect visible imagery, whereas an infrared (IR) sensor 40 could be used to gather imagery during the day or night.

Figure 2:
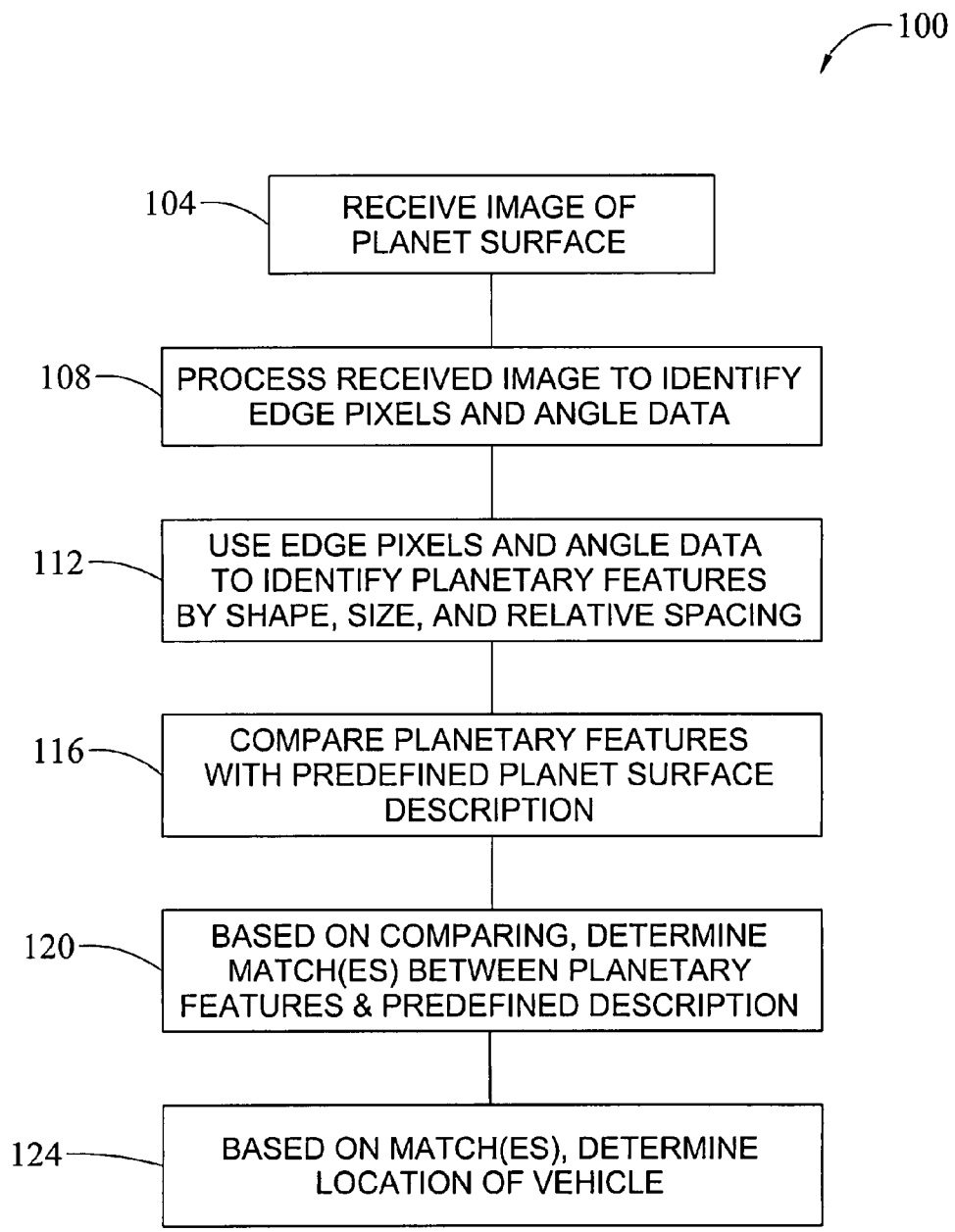
FIG. 2 is a flow diagram of a method of navigating a space vehicle in accordance with one implementation of the disclosure.

One navigation method that may be implemented by the system 20 is indicated generally in FIG. 2 by reference number 100. In step 104, the system 20 receives an image of the planet surface 44. In step 108 the system 20 processes the received image to identify a plurality of edge pixels and angle data for each of the edge pixels. In step 112 the system 20 uses the edge pixels and angle data to identify a plurality of planetary features by shape, size, and spacing relative to other planetary features. In step 116 the system 20 compares at least some of the identified planetary features. with a predefined planet surface description stored, e.g., in the library 36. In the present configuration, the predefined planet surface description includes sizes of a plurality of planet landmarks and locations of the landmarks on the planet. Based on the comparing, the system 20 in step 120 determines one or more matches between the planetary features and the predefined planet surface description. Based on the match(es), the system 20 in step 124 determines a location of the space vehicle relative to the planet.

Library Generation

In various implementations, the library 36 may be compiled prior to flight of the vehicle 24 in the following exemplary manner. Dependent on the surface characteristics of a planetary body of interest, suitable types of fixed landmarks on the planetary surface may be identified. For many planetary bodies, the most useful landmarks may include craters. Craters tend to be reasonably predictable in shape, variable in size, and distinctive in appearance. They also tend to have a high population density that tends to vary as a function of crater size. Other or additional types of landmarks, however, including but not limited to rills and/or ridges, could be used. Inasmuch as it can be desirable for the imaging sensor 40 to have a clear view of planetary surface features from orbit, various implementations are contemplated in connection with planets that tend to have clear atmospheres and stable, unmoving surfaces, e.g., the moon and/or Mars.

A survey of the planet may be made to collect landmarks of interest for inclusion in the library 36. In the following example, it is assumed that the body of interest is the moon and that the landmarks consist solely of craters of various sizes. In some implementations, because the imaging sensor 40 FOV (field of view) changes with altitude, craters are selected having a range of different diameters to accommodate different FOVs. In such manner, at least some of the craters may be small enough to fit easily within a given FOV of the imaging sensor 40 during subsequent data collection. On the other hand, the selected craters are at least an order of magnitude larger than the pixel size of the imaging sensor 40 to avoid digitization errors.

Craters may be excluded from the library 36, for example, that are too closely spaced to or intersecting with neighboring craters. It can also be advantageous to exclude craters with poorly-defined shape and/or craters unduly affected by other landmarks close by (such as mountains or cliffs with shadow effects that might be deleterious to imagery). Additionally, it can be advantageous to make a library of landmarks fairly uniform in population density, so that at least three and up to ten or more landmarks appear in any given field of view of the sensor 40. In some low-crater-density regions of the moon, it may be advisable to select all small crater sizes, since they tend to be consistently more populous than large craters. A completed library may contain locations (latitude, longitude) of the center of each crater, as well as the measured diameter for each crater. In various implementations in which landmarks other than or in addition to craters are included, the landmark shapes may be included in a predefined planet surface description. For rills, ridges, and/or other types of landmark shapes, other or additional appropriate dimensions and/or locations could be stored in the library 36 to describe such landmarks.

Image Processing

Figure 3:
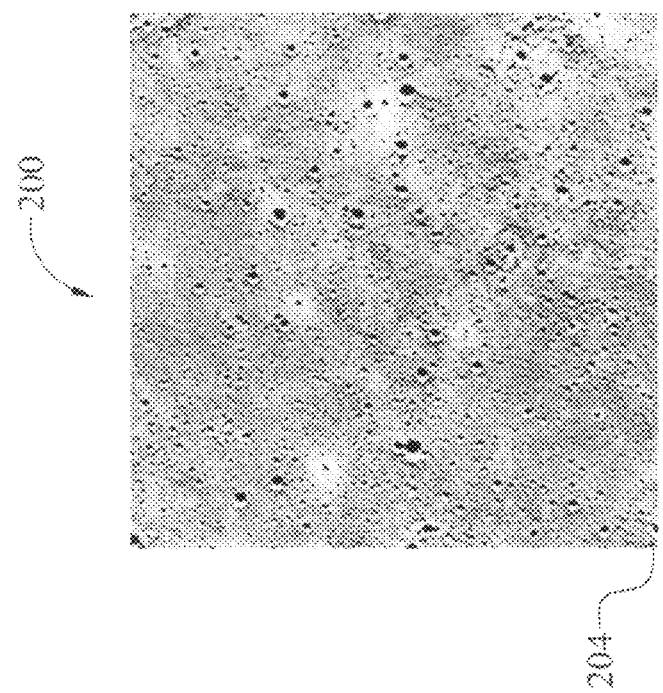
FIG. 3 is an illustration of an image received by an imaging sensor in accordance with one implementation of the disclosure.

During flight, the space vehicle 24 may determine its position, e.g., over the moon by first collecting imagery of the moon's surface directly below the vehicle (nadir view). An exemplary image received by an imaging sensor is indicated generally in FIG. 3 by reference number 200. The image 200 includes a plurality of crater images, one of which is indicated by reference number 204. An image received at the vehicle 24 may be processed to create an edge image from the original sensor image. A suitable edge algorithm, including but not limited to Sobel, Canny, and/or Boie-Cox methods, may be used to obtain a grayscale edge image. Pixels of the grayscale edge image are evaluated relative to a threshold value. A threshold value may be selected in various ways. For example, a histogram of the pixel values may be created, from which all values above the pixel intensity corresponding to a certain percentile of pixels (usually a high value, e.g., greater than 90 percent) may be selected. Above-threshold values are set to one and below-threshold values are set to zero to obtain a binary edge image.

Figure 4:
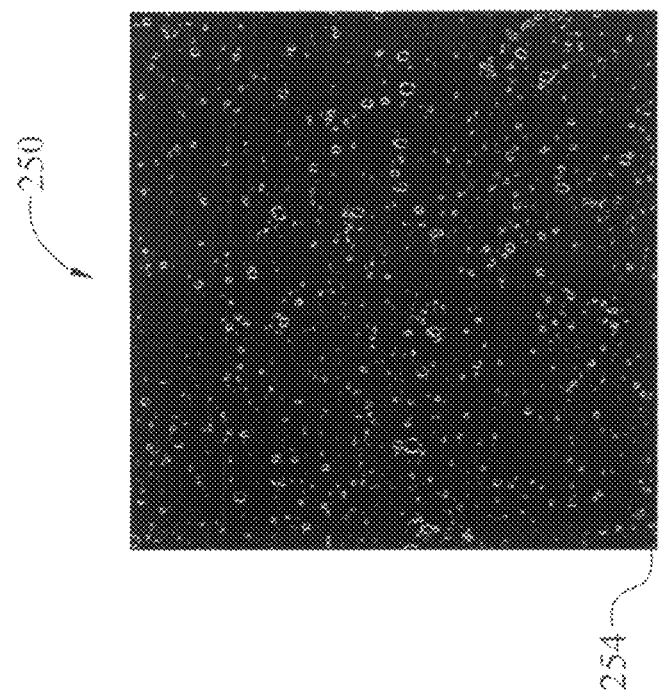
FIG. 4 is an illustration of a binary edge image in accordance with one implementation of the disclosure.

A binary edge image corresponding to the sensor image 200 is indicated generally in FIG. 4 by reference number 250. An edge 254 corresponds to the crater image 204 shown in FIG. 3. Angle data obtained through application of the edge algorithm is saved for each binary pixel associated with an edge as generated by the edge algorithm. Angle data may be computed in 45-degree increments, although other increments are possible.

Figure 5:
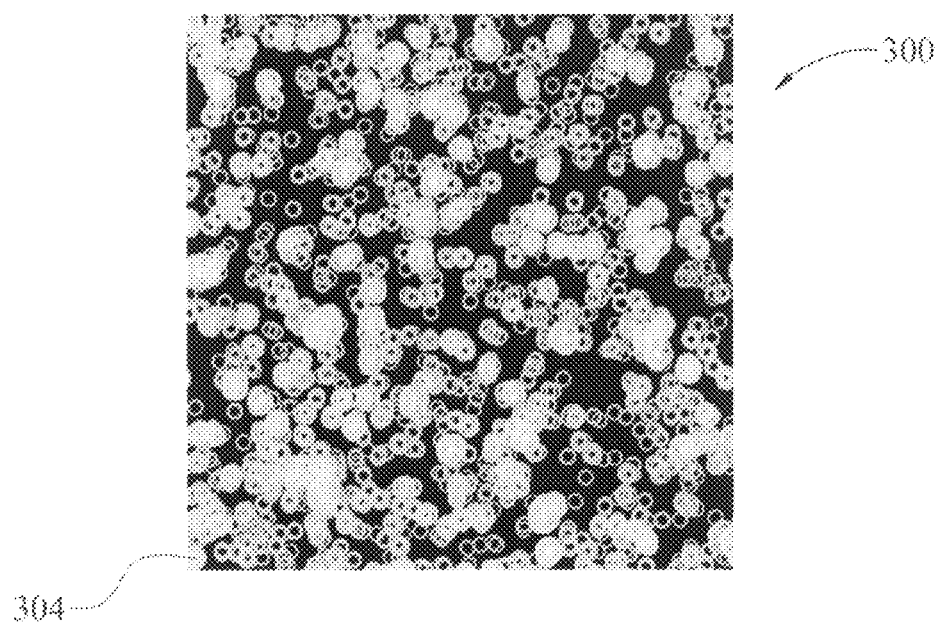
FIG. 5 is an illustration of an image of detected crater locations in accordance with one implementation of the disclosure.

The binary edge image 250 is used as an input to an algorithm to find features of interest (in the present example, craters). In one implementation, a filter configured to match a shape and size of a feature of interest is applied to the binary edge image 250. For generally circular objects such as craters, a Hough transform or similar algorithm designed to locate circular areas in an image may be used. For this type of processing, circular search masks with a specified radial band are applied individually to test for goodness of fit. The output of such processing is typically a grayscale image with bright point responses located at the center of circular features with radii matching the search radius band. An exemplary image indicated generally in FIG. 5 by reference number 300 includes circles 304 representing crater locations 204 found in the image 200. The image 300 was obtained using a Hough filter for a single search radius band as further described below. A threshold can be set for such an image to exclude extraneous low-response areas and leave only relatively high peaks of interest.

Figure 7:
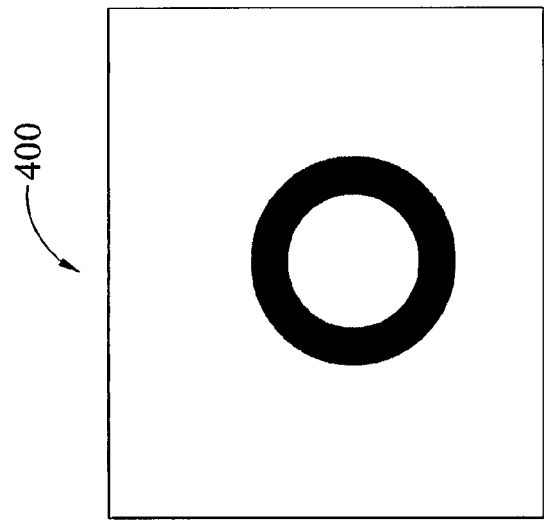
FIG. 7 is an illustration of a known filtering mask.
Figure 6:
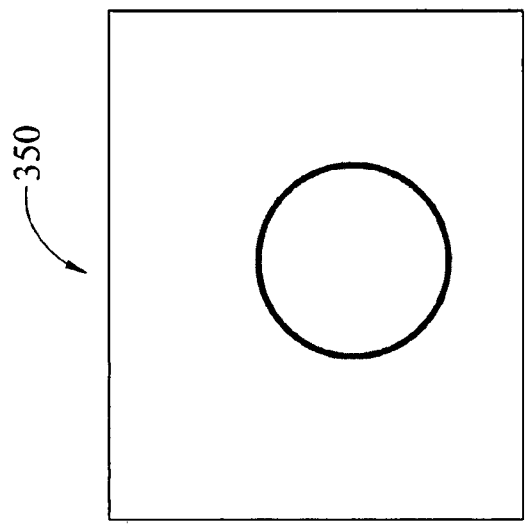
FIG. 6 is an illustration of an angle image in accordance with one implementation of the disclosure.

In connection with using standard Hough transforms, a binary mask may be created in the form of a circle having a radius of a given size of interest. The mask is then used as an input to the transform to create transformed arrays. In various implementations of the disclosure, where craters typically are not perfectly circular, it has been found advantageous to modify an input mask so that it has a circumference which covers an appropriate range, or band, of radii, rather than a single radius value. Such modification helps to enhance the intensity of peaks generated by the transformation and improves the chances of success in identifying each individual crater. A typical mask with a thin circumference is indicated generally in FIG. 6 by reference number 350. A mask having a radius band in accordance with some implementations of the disclosure is indicated generally in FIG. 7 by reference number 400.

The foregoing process may be repeated, wherein filter(s) corresponding to each additional radial band of interest are applied to the image 250. Peak intensities, their corresponding image or pixel locations, and their corresponding search radii may be accumulated into a data set of planetary features. Since a crater can produce a response from searches from closely matched radius bands, often two or more response peaks from different search radii may cluster together. Such clusters are primarily due to a single crater responding to searches from different radius bands. In such cases, only the highest peak (corresponding to the best radius fit) may be retained, and the others may be discarded.

Each peak in the data set of planetary features can be examined to verify that the match corresponds to a circular feature and not to random clutter. Specifically, all of the edge pixels that fall within a best-fit radius band for a given peak may be examined and scored according to the corresponding angle information stored with each edge pixel. Edge pixels from an edge of a circular feature will exhibit well-behaved angular transitions as the edge travels around the feature circumference. Clutter edge pixels will exhibit randomized angle values that can be used as a basis for rejecting false peaks.

Figure 8:
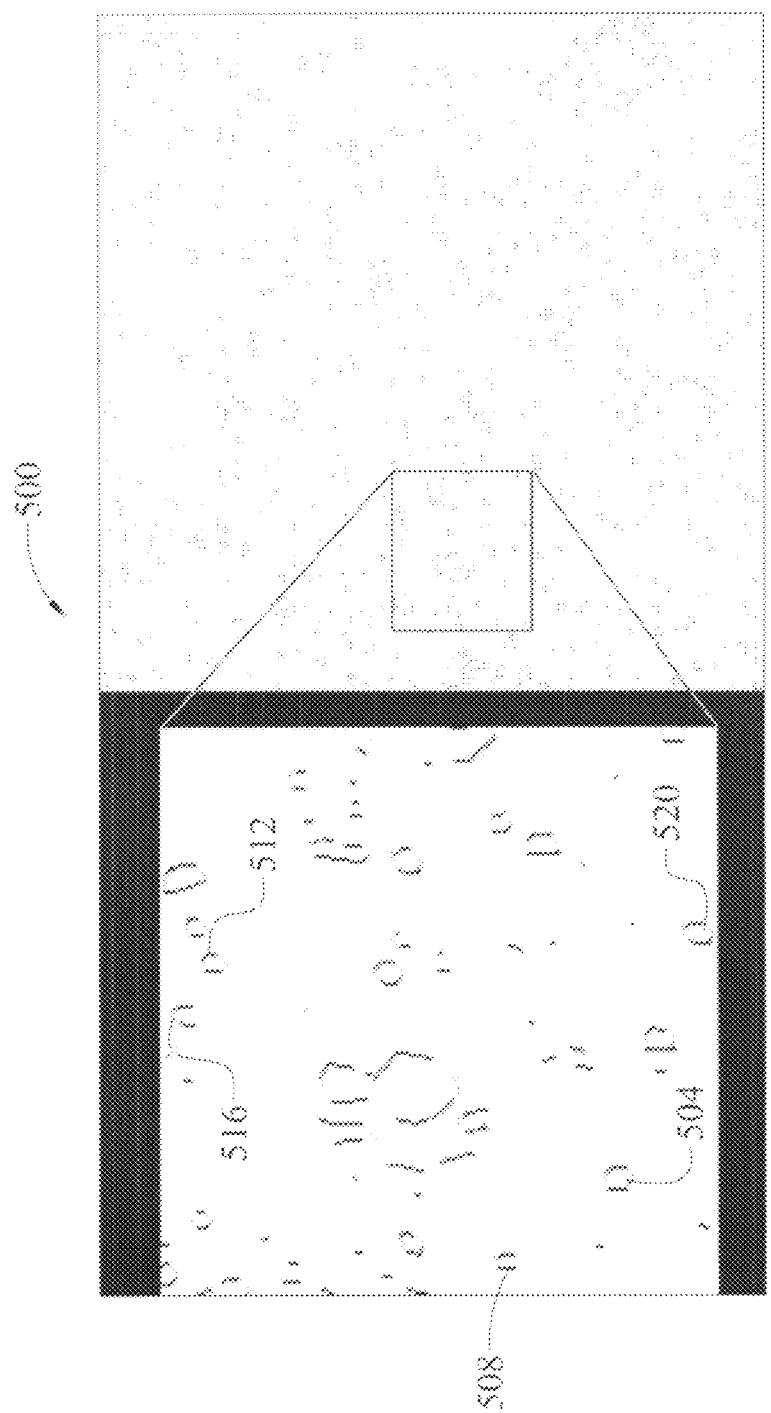
FIG. 8 is an illustration of a filtering mask in accordance with one implementation of the disclosure.

An exemplary angle image corresponding to the edge image 250 is indicated in FIG. 8 by reference number 500. In the image 500, color values are assigned to edges based on pixel angle range. In the present example, a range includes 45 degrees. Specifically, segments 508 are colored red to indicate ranges around 0 or 180 degrees. Segments 512 are colored yellow to indicate ranges around 45 or 225 degrees. Segments 516 are colored blue to indicate ranges around 90 or 270 degrees. Segments 520 are colored green to indicate ranges around 135 or 315 degrees. It can be seen in an image 504 of a crater feature that there is a continuous progression of angles around a substantially circular path.

Searching the Library

The resulting data set of planetary features may be compared by the processor 28 to some or all of the landmarks in the predefined planet surface description in the library 36. Such comparison may include looking at the spacing of individual craters relative to one other in the angle image 500 and comparing the spacing to that of each landmark relative to its neighbors as described in the library 36. Comparing may be performed, e.g., in angle space, by using distances described in the library 36 to determine distances in angle space and comparing the angle space distances with those of the imaged planetary features. Such comparisons can be shortened in various ways. For example, library 36 angle space distances larger than the sensor 40 FOV could be eliminated from comparison. Additional or alternative ways of comparing could be performed. For example, if distance between the sensor 40 and the planet surface 44 is known, comparison could be made in terms of distances, e.g., in meters. Additionally or alternatively, where a FOV is small, comparison could be made in terms of pixels. Combinations of crater spacing quickly approach a unique solution set as the number of craters examined increases. In practice, as few as three matching craters can produce a unique solution from landmarks in the library 36 to determine the position of the vehicle 24 over the planet surface 44. More typically, five or six craters may be matched to find a unique solution. As a further discriminator, the radius associated with each individual crater may be used to eliminate extraneous matches.

If a unique solution is not found after searching the entire predefined planet surface description in the library 36, the predefined planet surface description may be broken up into overlapping subsections which may be searched independently. In such manner, a plurality of examples of locally unique solutions may be found. In such case, choosing the correct solution can involve searching for other nearby craters with radii not specified in the original search until false alarms can be eliminated from the possible matches and a unique solution can be found.

Subsequent Searches

Once an initial planetary position has been established, it may not be necessary to search the library 36 for the entire planet for subsequent searches and position updates. Searching only the region around the last known position should be sufficient to find a new, updated position. The search can be widened, however, if for some reason a valid matching position is not obtained. One advantage of doing a limited search is decreased processing time.

Although the foregoing examples were discussed with reference to crater landmarks and imagery obtained from nadir views of a planetary surface, it should be understood that the disclosure is not so limited. For implementations in which rills, ridges, and/or other non-circular landmarks are used, non-overhead (e.g., over the horizon) images and/or algorithms may be used to predefine a planet surface description and/or compare view data to library-stored landmarks, which may have shapes other than or in addition to circular shapes. Thus, for example, a filtering mask could take a shape other than a circular shape.

Implementations of the foregoing method and system are very tolerant to false alarms, computationally fast, operational over a wide range of lighting conditions, reliable and inexpensive. The foregoing method has the advantage of needing only simple camera-type sensors and corresponding software to operate, and can be scaled to any orbital altitude. It is tolerant to false alarms, in that it does not require all library craters to be detected in any given field of view (only enough to determine a unique location), and is not degraded by picking up crater detections which do not match those in the library. These benefits are enhanced through the compilation of a landmark library prior to a mission that includes landmarks with logical spacing, size, and density for ease of matching. Craters, for example, can be selected which are well-formed, nearly circular, free from nearby anomalies, and robust in appearance over a wide range of sun angles. Additionally, determination of planetary position is independent from frame to frame, so position errors will not propagate over time.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of navigating a space vehicle, the method comprising:
   receiving an image of a planet surface;
   processing the received image to identify a plurality of edge pixels and angle data for each of the edge pixels;
   using a circular mask having a radius band that includes a range of radii, filtering the edge pixels to obtain a grayscale image in which a plurality of peaks identify centers of circles having radii in the range of radii;
   for a given peak and its corresponding radius band, scoring the angle data for the edge pixels corresponding to the corresponding radius band;
   using the scoring to determine whether to accept or reject the given peak as an indicator of a circular planetary feature;
   using accepted peaks to identify a plurality of planetary features by shape, size, and spacing relative to other planetary features;
   comparing at least some of the identified planetary features with a predefined planet surface description including sizes and locations of a plurality of planet landmarks;
   based on the comparing, determining one or more matches between the at least some planetary features and the planet surface description; and
   based on the one or more matches, determining a location of the space vehicle relative to the planet.

2. The method of claim 1, wherein the receiving is performed using an imaging sensor of the vehicle.

3. The method of claim 1, wherein comparing identified planetary features with the predefined planet surface description comprises comparing at least relative spacing and sizes of identified planetary features with the predefined planet surface description.

4. The method of claim 1, further comprising:
   using a second circular mask having a radius band that includes a second range of radii, filtering the edge pixels to obtain a grayscale image in which a plurality of peaks identify centers of circles having radii in the second range of radii.

5. The method of claim 4, further comprising: for a cluster of the peaks, retaining the highest peak and the radius band corresponding to the highest peak.

6. The method of claim 1, further comprising predefining the planet surface description, the predefining comprising including at least three landmarks for a field of view of an imaging sensor of the vehicle in the planet surface description.

7. The method of claim 1, further comprising performing the receiving and processing one or more times to predefine the planet surface description.

8. A method of navigating a space vehicle, the method comprising:
   receiving an image of a planet surface, the receiving performed using an imaging sensor of the vehicle;
   using the received image to obtain a grayscale image;
   evaluating pixels of the grayscale image relative to a threshold value to obtain a binary edge image and angle data for binary edge pixels of the binary edge image;
   using a circular mask having a radius band that includes a range of radii, filtering the binary edge pixels to obtain a grayscale image in which a plurality of peaks identify centers of circles having radii in the range of radii;
   for a given peak and its corresponding radius band, scoring the angle data for the binary edge pixels corresponding to the corresponding radius band;
   based on the scoring, accepting or rejecting the given peak as an indicator of a circular planetary feature;
   using one or more accepted peaks, determining one or more planetary features;
   comparing the one or more planetary features with a predefined planet surface description including positions and sizes of a plurality of planet landmarks;
   based on the comparing, determining one or more matches between the one or more planetary features the planet surface description; and
   based on the one or more matches, determining a location of the space vehicle relative to the planet.

9. The method of claim 8, further comprising:
   using a second circular mask having a radius band that includes a second range of radii, filtering the binary edge pixels to obtain a grayscale image in which a plurality of peaks identify centers of circles having radii in the second range of radii.

10. The method of claim 9, further comprising:
    for a cluster of the peaks, retaining the highest peak and the radius band corresponding to the highest peak.

11. The method of claim 8, wherein the one or more planet landmarks include at least one of the following: a crater, a rill, and a ridge.

12. The method of claim 8, wherein the one or more sizes of the one or more shapes are defined by one or more radii.

13. The method of claim 8, further comprising predefining the planet surface description based on one or more fields of view of the imaging sensor.

14. The method of claim 13, further comprising selecting landmarks for inclusion in the planet surface description based on a pixel size of the imaging sensor.

15. The method of claim 8, further comprising selecting, for inclusion in the planet surface description, landmarks having a size at least one order of magnitude larger than a pixel size of the imaging sensor.

16. A system for navigating a space vehicle comprising:
    an imaging sensor of the vehicle, the sensor configured to receive an image of a planet surface; and
    a processor and memory configured to:
       use the received image to obtain a first grayscale image;
       evaluate pixels of the first grayscale image relative to a threshold value to obtain a binary edge image and angle data for edge pixels of the binary edge image;
    using a first circular mask having a radius band that includes a first range of radii, filter the edge pixels to obtain a second grayscale image in which a plurality of peaks identify centers of circles having radii in the first range of radii;
    using a second circular mask having a radius band that includes a second range of radii, filter the edge pixels to obtain a third grayscale image in which a plurality of peaks identify centers of circles having radii in the second range of radii;

from a cluster of peaks in the second and third grayscale images, retain a highest peak and the radius band corresponding to the highest peak;

for a given retained peak and its corresponding radius band, scoring the angle data for the edge pixels corresponding to the corresponding radius band, the scoring performed to determine whether the given retained peak is surrounded by a substantially circular path to indicate a circular planetary feature;

based on the scoring, determine one or more planetary features;

compare the one or more planetary features with a predefined planet surface description including positions and sizes of a plurality of planet landmarks;

based on the comparison, determine one or more matches between the one or more planetary features and one or more of the landmarks; and based on the one or more matches, determine a location of the space vehicle relative to the planet.

17. The system of claim 16, wherein the processor and memory are further configured to navigate the vehicle based on the determined location of the space vehicle.

18. The system of claim 16, wherein the processor and memory are further configured to:
   divide the predefined planet surface description into a plurality of sections; and
   compare the one or more planetary features with each of the sections to determine a match between the one or more planetary features and one or more of the landmarks.

19. The system of claim 18, wherein the processor and memory are further configured to compare one or more additional determined planetary features to resolve an ambiguity between matching landmarks.

20. The system of claim 16, wherein the processor and memory are further configured to use a radius associated with a crater to eliminate extraneous matches between the one or more planetary features and one or more of the landmarks.

* * * * *